Patented July 12, 1932

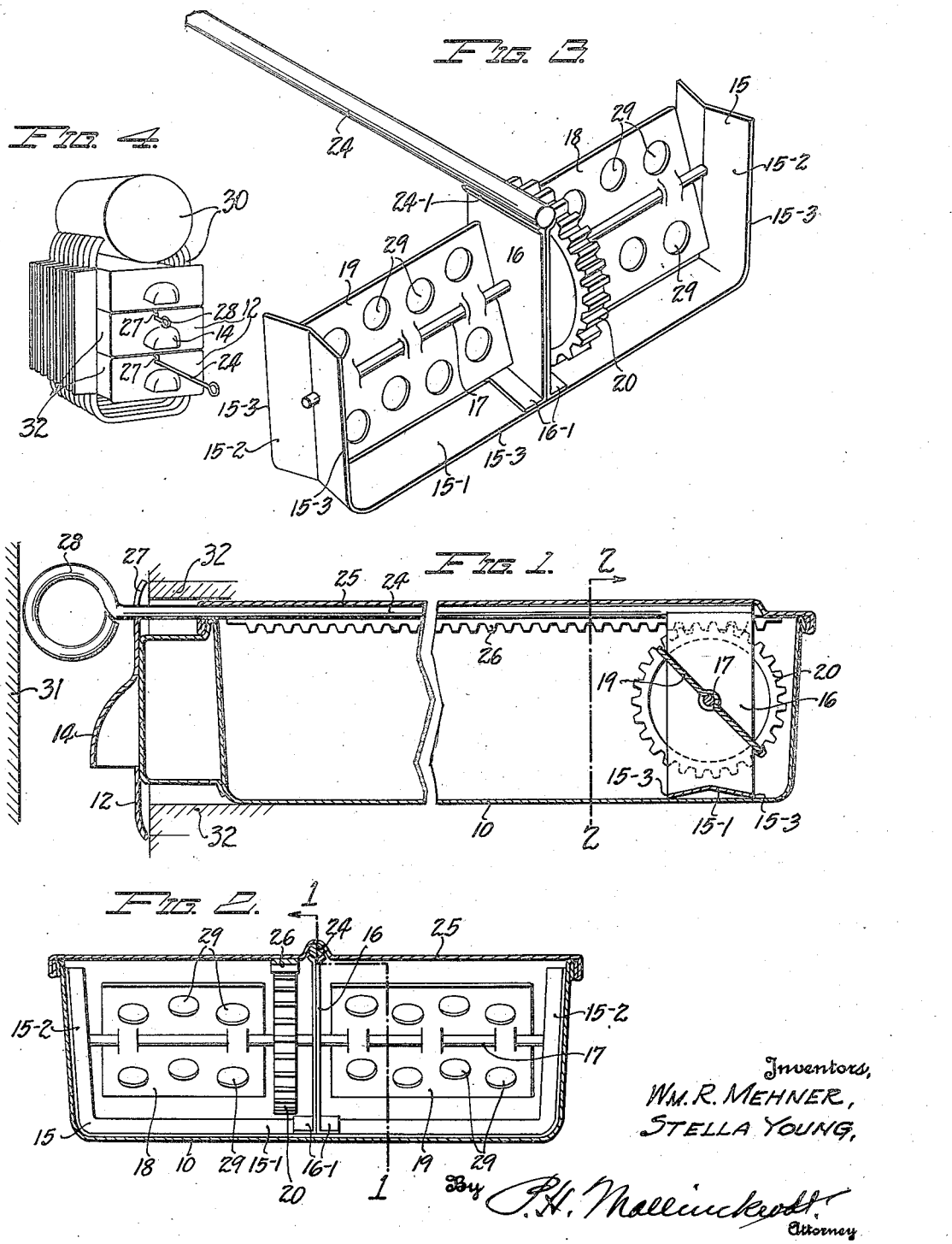

1,867,017

UNITED STATES PATENT OFFICE

WILLIAM R. MEHNER AND STELLA YOUNG, OF BRIGHAM, UTAH

FREEZER FOR ICE CREAM AND THE LIKE

Application filed May 5, 1930. Serial No. 449,923.

This invention relates to a freezer for ice cream and the like, and more particularly to an ice cream freezer for use in refrigerators, especially electric refrigerators.

The principal objects of the invention are to provide:

First. A device in which, when placed in a refrigerator, ice cream, ices, custards and so on, may be frozen.

Second. Means for properly stirring the ingredients of a food mixture during the process of freezing.

Third. Means whereby the uneven freezing of food mixtures as ordinarily placed in refrigerators, may be prevented.

Fourth. Simple and effective means to accomplish the desired end.

Fifth. A device which may easily be kept in a sanitary condition.

Sixth. A device which is applicable to existing refrigerators.

In attaining the objects just outlined, we provide a carriage or dasher, which fits inside a suitable container, such as a freezing tray of an electric refrigerator. The carriage supports one or more blades or vanes which preferably are rotatably mounted so as to be actuated whenever the carriage is moved back or forth in the tray. The rotation of the blades may be effected by means of a gear in mesh with a rack, the latter being preferably fastened to a lid which covers the freezing tray. The carriage may be actuated manually by means of a tongue, which protrudes from the front of the freezing tray, and which may be grasped by the user.

The freezing tray, carriage and lid are all separate from one another, so as to provide for convenient dissembling and thorough cleaning.

The features of this invention, for which the protection of Letters Patent is desired, are collectively grouped in the claims concluding this specification.

In the drawing, which illustrates one embodiment of this invention,

Fig. 1 represents a vertical longitudinal section taken along line 1—1, Fig. 2;

Fig. 2, a vertical cross-section taken on line 2—2, Fig. 1;

Fig. 3, a rear view in perspective of the carriage, drawn to a scale somewhat enlarged; and Fig. 4, a view in perspective, drawn to a reduced scale, of the freezing unit of an electric refrigerator removed from the main structure.

Referring to the drawing, numeral 10 indicates a freezing tray as commonly used in an electric refrigerator, such as the well known Frigidaire, the said tray serving as a container in which ice cream or the like is frozen.

This freezing tray 10 may have the usual front 12 and be provided with the customary drawer pull 14. Within the tray and disposed so as to be movable back and forth, is a carriage or dasher, which may be composed of a frame 15 having the bottom portions 15—1 and the upwardly extending side portions 15—2. The frame may be made of a strip of metal shaped so as to have a grooved cross-section, for instance, in the form of an inverted V with an obtuse angle, which gives strength and rigidity to the frame and at the same time provides two scraping lips or edges 15—3 from which inclined blades extend upwardly and inwardly of the frame, thereby constituting a double-acting scraper. This double-acting scraper substantially contacts the refrigerated surface or surfaces of the tray, and serves to loosen the congealing substance immediately adjacent these surfaces. The upwardly and inwardly inclined surfaces of the scraper when moved in either direction, also serve to lift the loosened mass and to crowd it into the path of one or more movable paddles or stirrers, such as indicated at 18 and 19. At the same time, the frame is drawn down so as to bring the lips in close contact with the bottom of the container, thereby tending to hold the frame and its appurtenances down in the ice cream or other like substance. The side portions of the frame may have lips and inclined surfaces similar to those just described, for the purpose of scraping the sides of the container. Thus, the congealing mass is easily worked into a smooth, uniform consistency.

A standard 16 may be rigidly fastened, as indicated at 16—1, on the bottom portion 15—1 of the carriage, and a shaft 17 be journaled in the side portions 15—2 and in the standard 16. The paddles 18 and 19 may be rigidly mounted on this shaft, together with a toothed wheel or gear 20. To the top of the standard 16 may be rigidly fastened, for instance by soldering at 24—1, a tongue 24. A cover, such as indicated at 25, may be provided for the freezing tray, and a rack 26, in mesh with the gear 20 may be rigidly attached to the under side of the cover.

The tongue 24 extends through a notch 27 in the front 12, and may terminate in a loop 28 adapted to be grasped by the user. By pulling or pushing on the tongue, the carriage is moved forward or back as the case may be, at the same time causing the toothed wheel 20 to rotate in one or the other direction, due to its engagement with the stationary rack, thus rotating the paddles 18 and 19 whereby the contents of the tray are stirred. These paddles may be of any desired form, though substantially flat blades, as indicated in the present drawing by the aforementioned numerals 18 and 19, and having perforations 29, give good results. Any one or several of the trays in a freezing unit 30 of an electric refrigerator, may be equipped with the present device, an instance being indicated in Fig. 4, where the trays are in sleeves 32.

In using this device, supposing a mixture for freezing to be contained in a tray, and the various operating parts to be in place therein, it is only necessary to at intervals open the door 31, Fig. 1, of a refrigerator (not shown) and give the tongue in the freezing tray a few strokes back and forth, thereby causing the dasher to amalgamate the mixture into an evenly frozen, velvety mass.

While a specific embodiment of our invention is herein shown and described, it is to be understood that various changes could be made therein without departing from the spirit and scope of the invention as defined in the claims.

Having fully described our invention, what we claim is:

1. A freezer for ice cream and the like, including in combination, a container, a frame having upwardly extending side portions longitudinally movable back and forth in said container, a scraper between said side portions, a stirring element rotatably mounted in said upwardly extending side portions above said scraper, a tongue extending from said frame to a point outside said container, and means whereby said stirring element is rotated when said frame is moved back and forth.

2. A freezer for ice cream and the like, including in combination, a container, a dasher having a bottom portion with upwardly and inwardly inclined surfaces movable back and forth within said container and longitudinally thereof, a tongue connected to said dasher, and a rack in proximity to said dasher; said dasher having a toothed wheel and stirrer mounted rotatably thereon, said toothed wheel being in mesh with said rack.

3. In combination, a freezing tray, a cover for said freezing tray, a rack fixed internally on the under side of said cover, a dasher movable along said rack, and a tongue extending from said dasher to a point outside said freezing tray, said dasher including a frame, a shaft in said frame, and paddles and a toothed wheel mounted on said shaft, said toothed wheel being adapted to mesh with said rack only when said cover is in the closed position.

4. In combination, a freezing tray having a separable cover, a dasher movable back and forth in the freezing tray, and a tongue extending from said dasher to a point in front and outside of said freezing tray, said dasher having rotatable stirrers and a driver for said stirrers, and said cover having means effective to actuate said driver when the dasher is moved.

5. In combination, a freezing tray having a notched front portion, a scraper having lips substantially in contact with the inside surface of said freezing tray, said scraper further having inclined surfaces extending upwardly and inwardly from said lips, stirrers mounted on said scraper, and a tongue extending from said scraper through said notched front portion.

6. In combination, a freezing tray adapted for disposition in the freezing compartment of a refrigerator, said freezing tray having a perforate front portion disposed in proximity to the door of said refrigerator, a double-acting scraper having a grooved cross-section with lips contacting the bottom of the freezing tray, rotatable paddles with a toothed driver on said scraper, a separable lid on said freezing tray, a rack attached to said lid so as to mesh with said toothed wheel when the lid is closed, and a tongue extending from said scraper through said notched portion.

WILLIAM R. MEHNER.
STELLA YOUNG.